(12) United States Patent
Millen, II et al.

(10) Patent No.: US 7,685,043 B2
(45) Date of Patent: Mar. 23, 2010

(54) FOREST FACTORY VALUATION MODEL

(75) Inventors: Jonathan A. Millen, II, Miami, FL (US); Luke Leslie, London (GB); Paul Sheridan, East Sussex (GB)

(73) Assignee: Accenture Global Services GmbH (CH)

(*) Notice: Subject to any disclaimer, the term of this patent is extended or adjusted under 35 U.S.C. 154(b) by 593 days.

(21) Appl. No.: 11/533,158

(22) Filed: Sep. 19, 2006

(65) Prior Publication Data

US 2007/0073604 A1    Mar. 29, 2007

Related U.S. Application Data

(60) Provisional application No. 60/721,183, filed on Sep. 27, 2005.

(51) Int. Cl.
*G06Q 40/00* (2006.01)

(52) U.S. Cl. .................. 705/35; 705/36; 705/1; 705/40; 705/41; 111/102; 111/103; 715/720; 715/730

(58) Field of Classification Search .............. 705/1–50; 111/102–103; 715/730–750
See application file for complete search history.

(56) References Cited

U.S. PATENT DOCUMENTS 5,947,041 A * 9/1999 Licht ..................... 111/200
6,250,237 B1 * 6/2001 Licht ..................... 111/200
2005/0043971 A1 * 2/2005 Hendrickson et al. ........ 705/4

OTHER PUBLICATIONS

Gan, J.; Benefits to Landowners from Forest Biomass/Bioenergy Production; 2007; Southern Forest Research Partnership, Inc. pp. 225-227.*

* cited by examiner

*Primary Examiner*—James P Trammell
*Assistant Examiner*—Marissa Liu
(74) *Attorney, Agent, or Firm*—Banner & Witcoff, Ltd.

(57) ABSTRACT

Apparatuses, computer media, and methods for determining a value of a forest factory. A stump land value component and a biomass component of a forest factory are determined. A value of the forest factory is obtained by combining the components. The stump land value component may be normalized by a crop rotation time period. A carbon value component of a forest factory may be determined and the value of the forest factory adjusted. A land parcel may be partitioned into land partitions, in which forest parameters are associated with each land partition. A stump land value component, a biomass fuel value component, and a carbon credit value component may be determined from the land partitions. The carbon credit value component may be determined a percentage of coniferous trees, deciduous trees, and corresponding constant values of oxygen generation.

9 Claims, 8 Drawing Sheets

Representative Timberland Sales 2000 – 2005

| Company | Acres (000) | Value/US$ acre | Total (US$ million) |
|---|---|---|---|
| Boise Cascade | 2,200 | 750 | 1,650 |
| Georgia Pacific | 4,720 | 847 | 4,000 |
| International Paper | 4,900 | 816 | 4,000 |
| Louisiana Pacific | 301 | 683 | 206 |
| PCA | 385 | 649 | 250 |
| SAPPI | 900 | 200 | 180 |
| Stora Enso | 300 | 473 | 142 |
| Weyerhauser | 736 | 1,145 | 843 |

Source: Accenture Research, Company Annual Reports, Press Releases

FIG. 1 (PRIOR ART)

FOREST FACTORY VALUATION MODEL

This application claims priority to provisional U.S. Application No. 60/721,183 ("The Forest Factory Valuation Model"), filed Sep. 27, 2005, the entire disclosure of which is hereby incorporated by reference.

FIELD OF THE INVENTION

This invention relates generally to modeling a forest factory. More particularly, the invention provides apparatuses, computer media, and methods for determining a value of a forest factory.

BACKGROUND OF THE INVENTION

In recent years, pulp, paper, and lumber producers have been taking a close look at the forests they own in mature markets in areas such as the United States and Western Europe. In many cases, the pulp, paper, and lumber producers are concluding that the wisest course is to sell off those assets. However, evolving economic realities are bringing new variables into the equation. As a result, companies that simply follow the current conventional wisdom of shedding forest real estate may be losing significant and growing sources of value and limiting their ability to build high-performance businesses over the long term.

The trend toward divesting forest assets is driven by a number of very real issues facing owners of timberland in Europe and North America. These include the rising costs of key drivers such as crop protection and mechanical harvesting, the landed price volatility of harvested timber, and environmental concerns over harvesting—all of which raise fundamental questions about the future value of forests in mature markets.

By selling off those assets, in accordance with the prior art, companies can focus on reducing the cost of fiber by sourcing from less expensive regions. Such divestment can also free up cash from what is seen as a questionable long-term investment, and make cash available for distribution to investors or for other business investments. The proceeds from such divestments can be considerable. From 2000 to 2005, for example, Georgia-Pacific and International Paper each brought in some US$4 billion from the sale of timberland as shown in FIG. 1.

The above divestment strategy is based on the traditional value streams associated with owning the forest, such as lumber, pulp and chemical by-products. However, the corresponding list may be incomplete since the list represents only one aspect of the forest's broader value. Consequently, the above divestment strategy may ignore additional streams of revenue.

There exists a need in the art for systems and methods that support additional streams of revenue from a forest in order to increase the profitability of the owner.

BRIEF SUMMARY OF THE INVENTION

The present invention provides apparatuses, computer media, and methods for determining a value of a forest factory.

With one aspect of the invention, a stump land value component and a biomass component of a forest factory is determined. A value of the forest factory is obtained by combining the components. The stump land value component may be normalized by a crop rotation time period.

With another aspect of the invention, a carbon value component of a forest factory is determined and a value of the forest factory is adjusted.

With another aspect of the invention, a land parcel is partitioned into land partitions, in which forest parameters are associated with each land partition. A stump land value component, a biomass fuel value component, and a carbon credit value component may be determined from the land partitions.

With another aspect of the invention, a carbon credit value is determined a percentage of coniferous trees, deciduous trees, and corresponding constant values of oxygen generation.

BRIEF DESCRIPTION OF THE DRAWINGS

The present invention is illustrated by way of example and not limited in the accompanying figures in which like reference numerals indicate similar elements and in which:

FIG. 1 shows representative timberland sales in accordance with prior art.

FIG. 4 shows average monthly oil prices (1998-2005) exemplifying oil prices that embodiments of the invention can adjust to.

FIG. 5 shows biomass fuel and total energy consumption (2002) exemplifying biomass fuel prices that embodiments of the invention can adjust to.

DETAILED DESCRIPTION OF THE INVENTION

Figure 2:
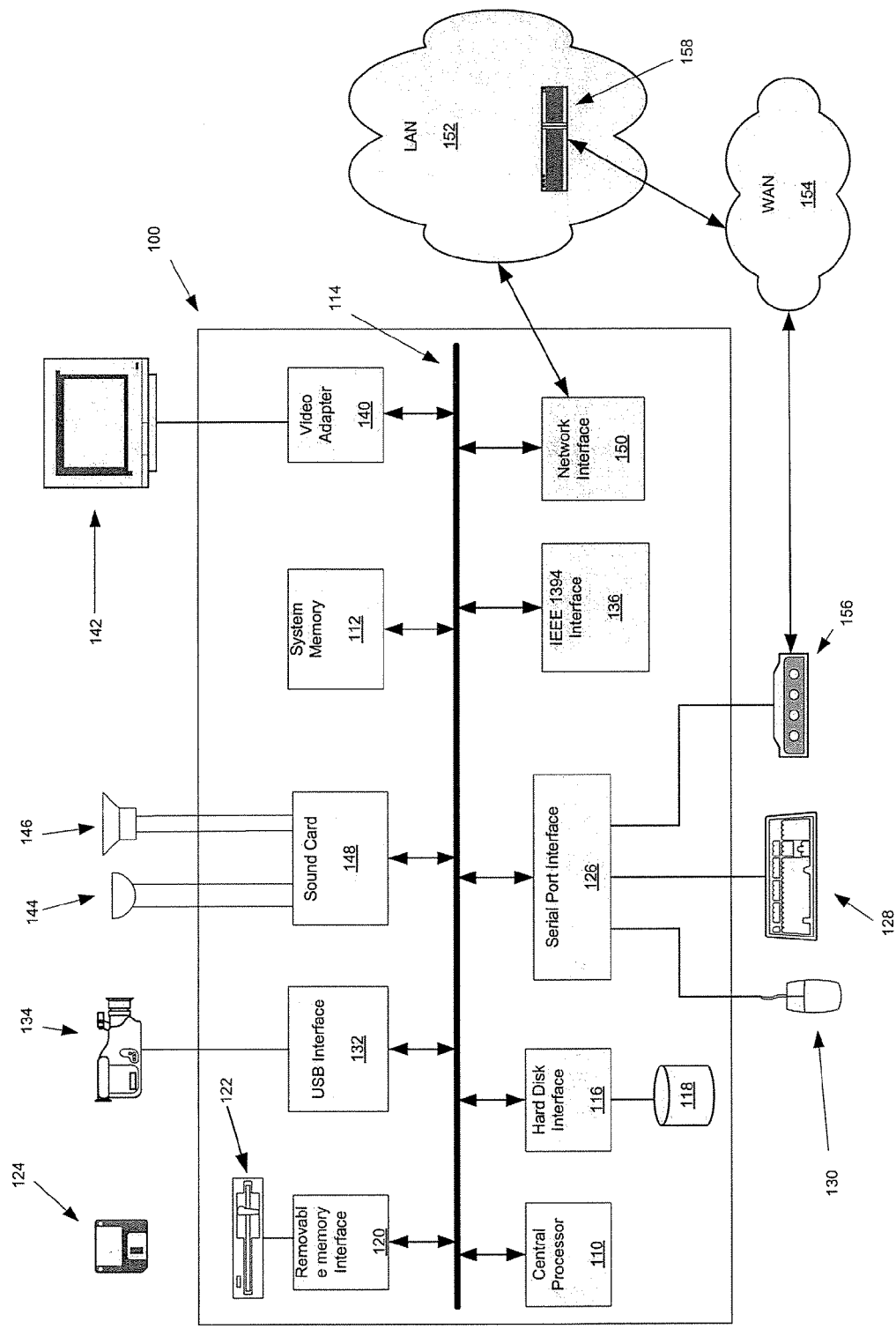
FIG. 2 shows a computer system that supports an embodiment of the invention.

FIG. 2 shows computer system 100 that supports an embodiment of the invention. Elements of the present invention may be implemented with computer systems, such as the system 100 shown in FIG. 2. (System 100 may support apparatus 700 as will be discussed.) Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 2 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 2 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FireWire developed by Apple Computer and i.Link developed by Sony. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 2 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 2 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 2 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, and data structures that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants and the like. Furthermore, the invention may also be practiced in distributed computing environments where tasks are performed by remote processing devices that are linked through a communications network. In a distributed computing environment, program modules may be located in both local and remote memory storage devices.

As will be discussed, system memory 112 may contain computer executable instructions that are executed by central processor 110 to determine a value of a forest factory using EQ. 1 or EQ. 2. Also, hard disk drive 118 may contain various forest parameters that are associated with the forest factory when determining the value of the forest factory. A user may input relevant information (e.g., an identification of the forest factory) through keyboard 128 or pointing device 130 and may view results through display device 142.

Figure 3:
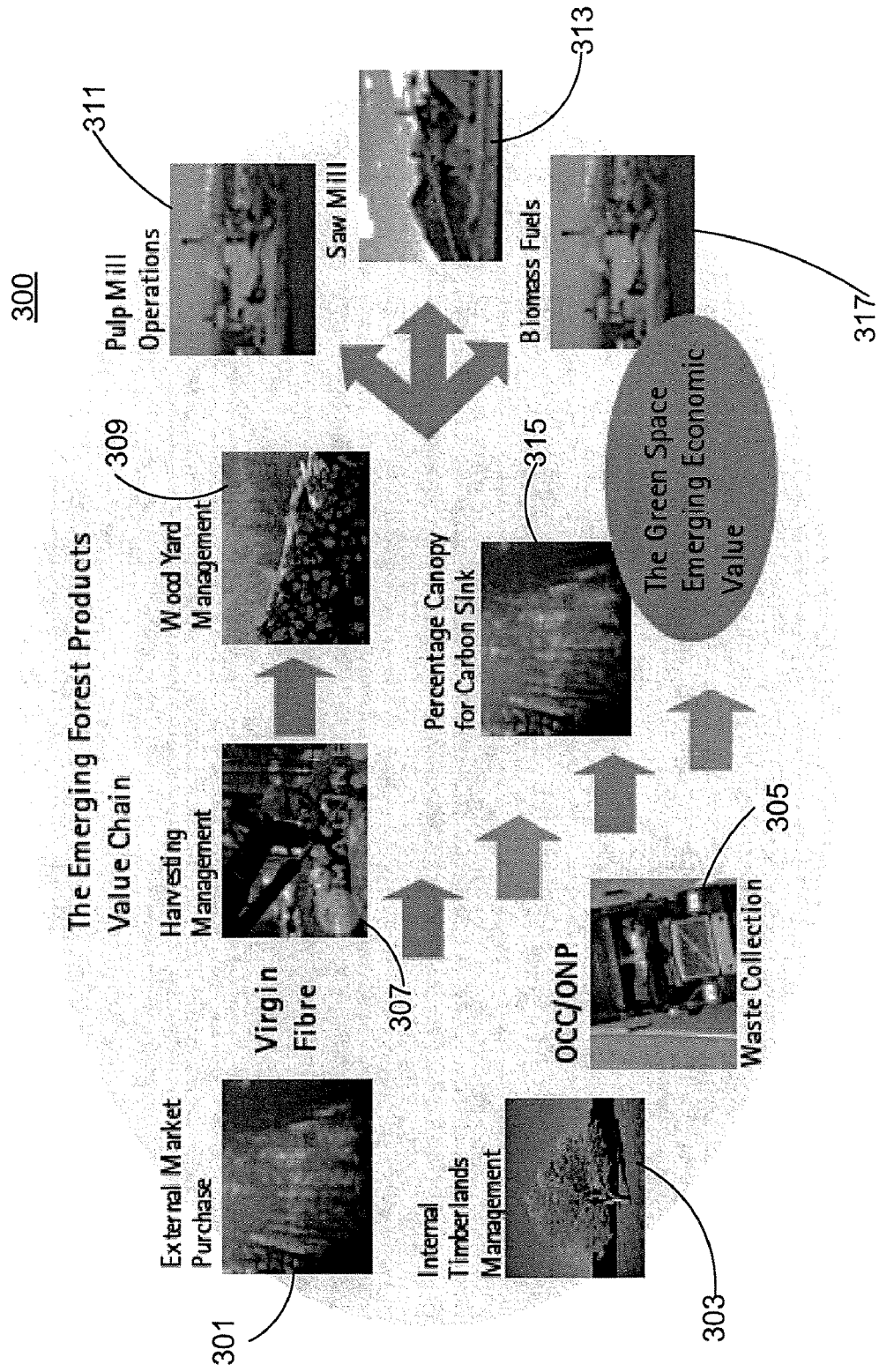
FIG. 3 shows sources of economic value from a forest factory in accordance with an embodiment of the invention.

FIG. 3 shows sources of economic value from forest factory 300 in accordance with an embodiment of the invention. In order to understand the real worth of forest factory 300 in the coming years, companies should consider developments in the fields of environmental policy and energy, and the new value streams they promise to bring forest owners. Sources 301-313 (revenue streams) of forest factory 300 include sources corresponding to paper products and to lumber products. Moreover, with a more comprehensive view of forest factory 300, there are two additional basic sources of value that companies need to consider: the emerging carbon-credit trading system (corresponding to source 315), which places value on the oxygen production and carbon-sink qualities of the forest; and the "forest refinery"—that is, the potential to use wood and recovered fiber as a source of biomass fuel (corresponding to source 317). Research suggests that companies that proactively manage these areas may add 10 to 30 percent of economic value to their forest holdings.

Biomass fuel may be generated from forest components that are typically considered as being wastes. (Biomass fuel may be derived from wood chips from diseased trees, tree bark, sap, branches, leaves, and tree roots. Basically biomass offers the energy user a chance to convert a biological material, i.e., corn, wood chips, pig manure, used cooking oil, to a fuel which can be stored easily and then burned to produce energy.) This approach is useful when you have waste biological materials and can use them to produce inexpensive fuel. Thus, each biomass production system is quite individual, depending on circumstances and available resources. For example, the waste wood may be converted to a burnable gas.

By fundamentally rethinking their concept of the forest factory 300, companies may be able to tap into these significant new sources of value. That in turn can help them address shareholder pressures for improved returns, and ultimately help them move forward on the road to becoming a high-performance business—in particular, one that can deliver sustainable results and consistently outperform their peers over time.

While no one can predict the future with absolute certainty, of course, current economic trends suggest that new value streams will increase. For example, the recently signed U.S. Energy Policy Act of 2005 and potential global environmental agreements—such as a modified Kyoto Protocol that may require companies to "pay" for carbon dioxide emissions—make carbon-credit trading increasingly viable. In addition, with relatively straightforward harvest-management and crop-rotation techniques, the carbon-credit value stream may coexist with the traditional "extraction" value stream, allowing companies to ensure that approximately 80 percent of their forest lands are available for carbon credits without limiting the availability of lumber and pulp (which correspond to a stump land value). Moreover, the carbon credit value may be adjusted for the crop rotation period. For example, as the crop rotation period decreases, less of the forest is available for carbon credits.

Figure 4:
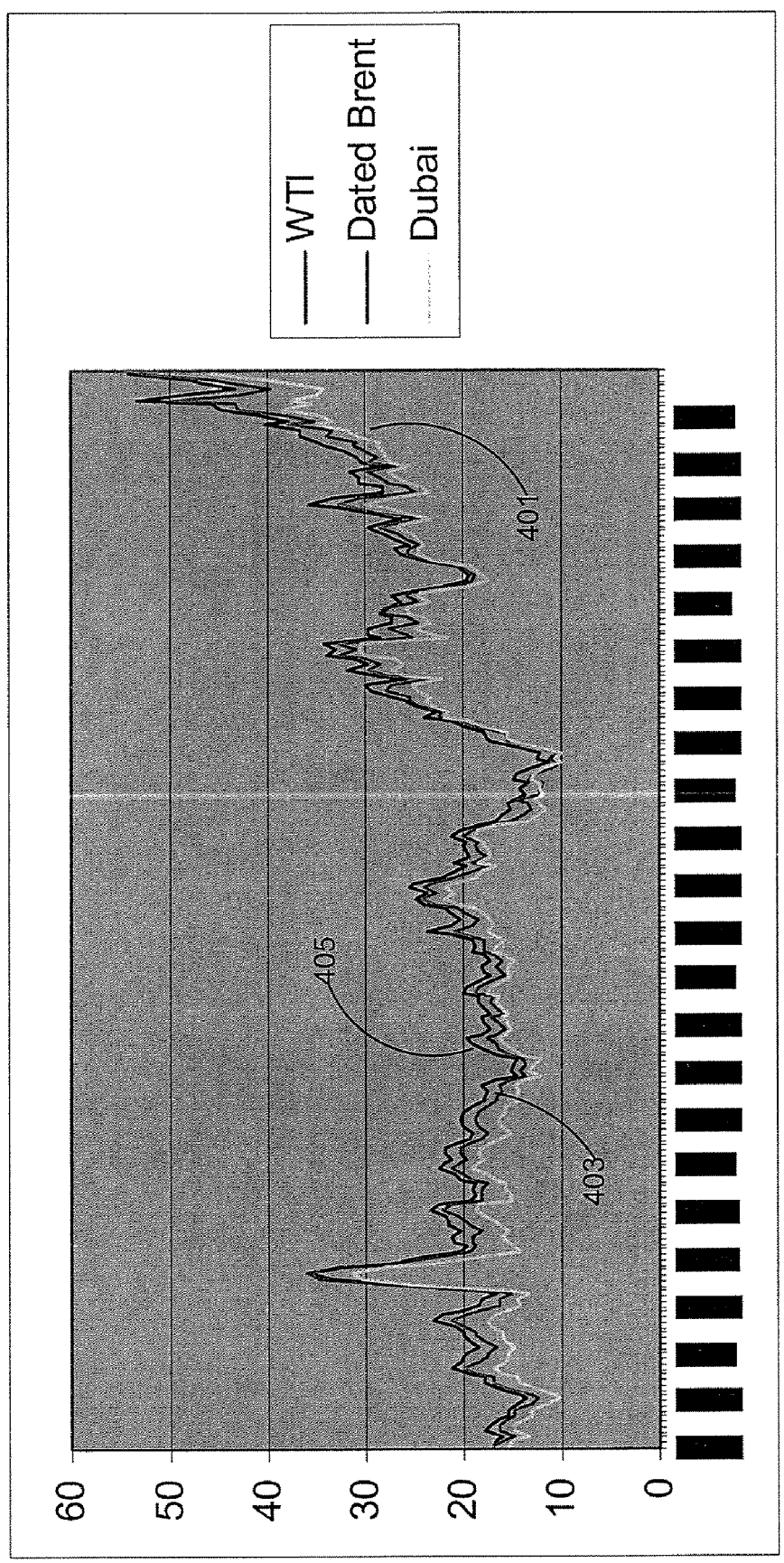

FIG. 4 shows average monthly oil prices (1998-2005) exemplifying oil prices that embodiments of the invention can adjust to. The average monthly oil prices correspond to different oil markets that include Dubai oil average 401, Dated Brent oil average 403, and WTI oil average 405. The biomass fuel value stream (corresponding to source 317) is likely to benefit from rising oil costs, making alternative energy sources more attractive. Oil prices have been fluctuating well above US$50 a barrel for more than a year and currently is approaching US$70/barrel as shown in FIG. 4. Although these increases have long been viewed as cyclical, there is now a growing consensus that oil pricing actually represents a structural change in the market and that high oil prices are long-term if not permanent.

Figure 5:
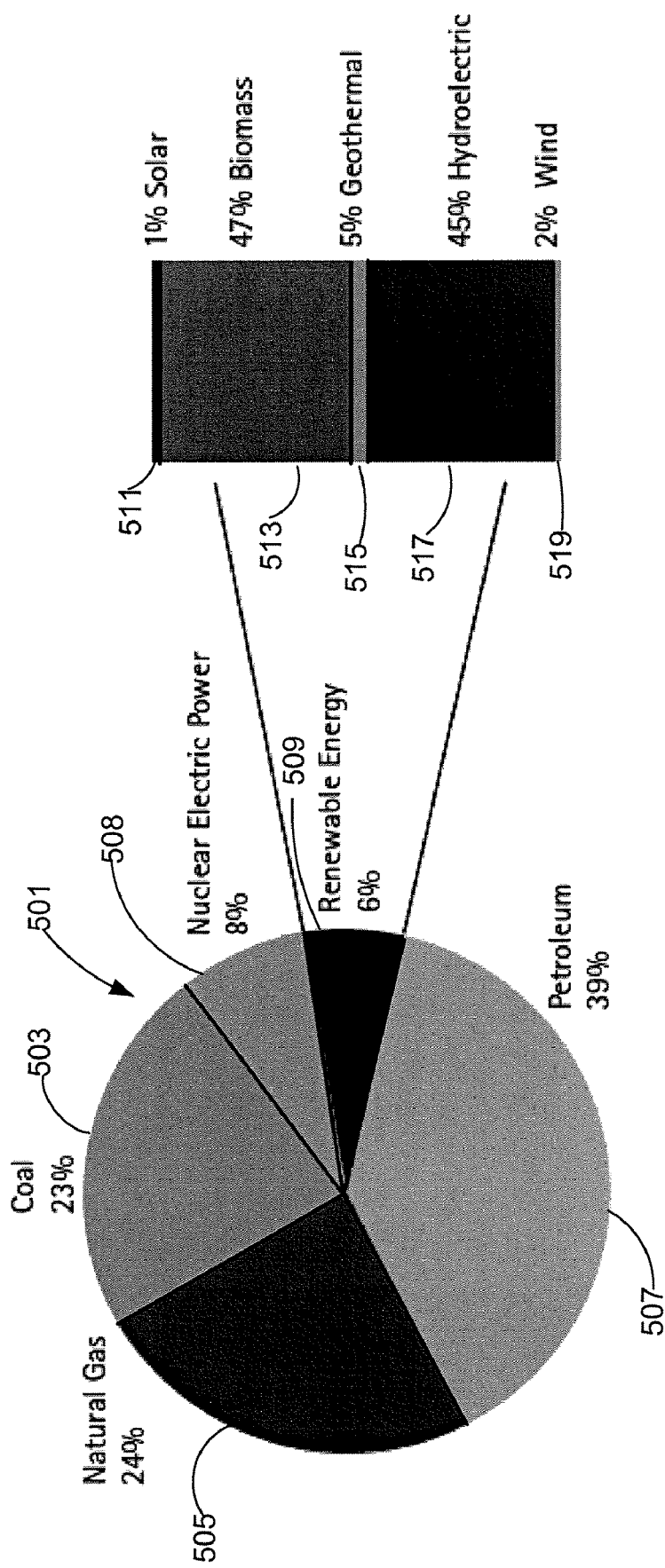

FIG. 5 shows biomass fuel and total energy consumption (2002) (corresponding to pie chart 501), exemplifying biomass fuel prices that embodiments of the invention can adjust to. While fossil fuels (corresponding to coal market share 503, natural gas market share 505, and petroleum market share 507) and nuclear power (corresponding to nuclear electric power market share 508) dominate the energy market, renewable energy market share 509 is gaining more importance. Renewable energy is generated from a number of energy generation sources including biomass generation 513, hydroelectric generation 517, geothermal generation 515, wind generation 519, and solar generation 511. As shown in FIG. 5, biomass generation 513 and hydroelectric generation 517 provide the majority share of the renewable energy market share 509. The move toward biomass fuels is also getting a boost from various "green" energy incentives already in place in many developed economies. Political pressure is growing in many parts of the world to increase the use of renewable energy sources and the governments of Sweden, Finland and Germany have all sponsored major electricity-generation projects based on biomass fuels. Biofuels already account for nearly half the energy produced from renewable sources in the United States (as shown in FIG. 5).

Figure 6:
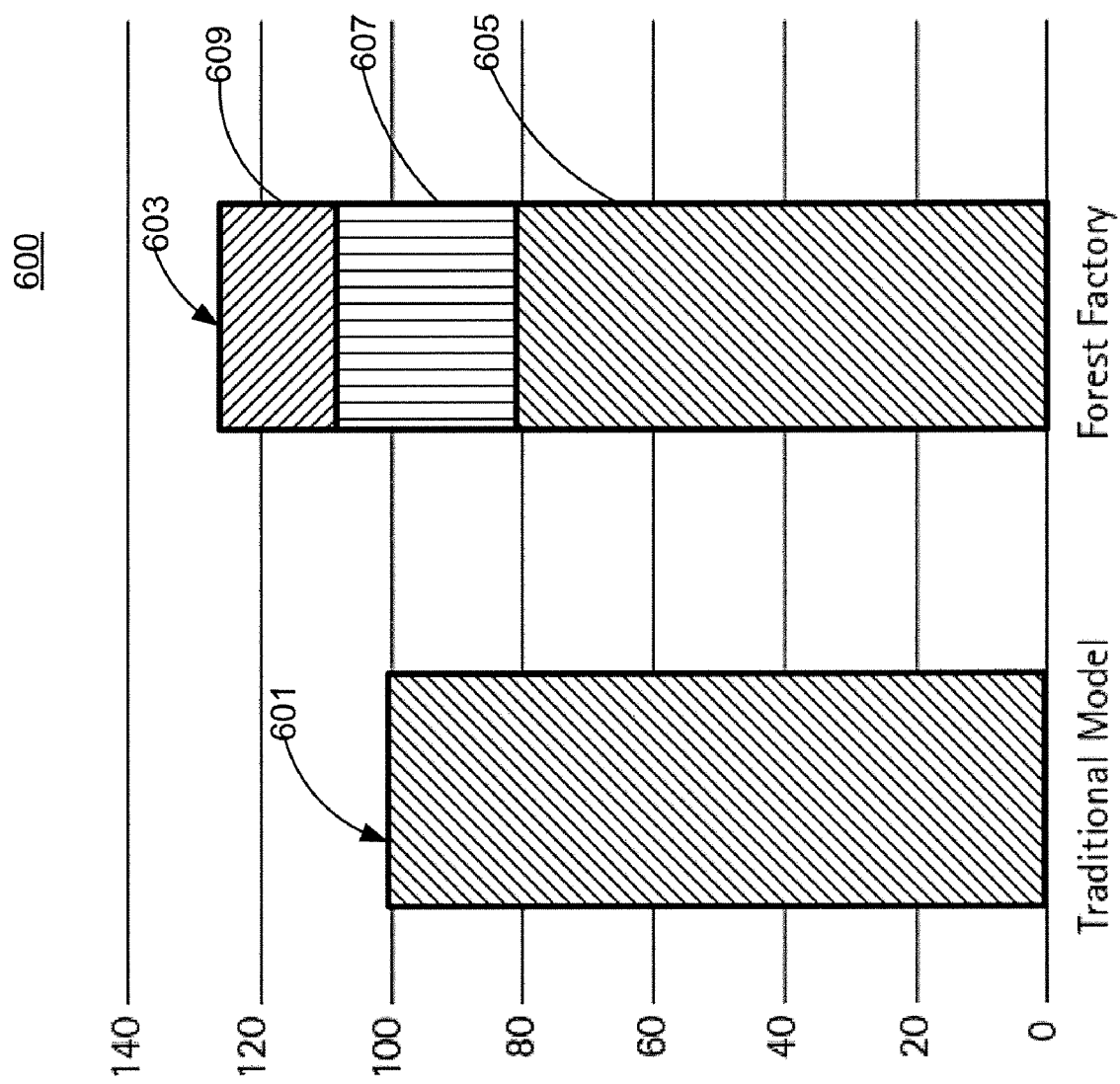
FIG. 6 shows a forest value stack in accordance with an embodiment of the invention.

FIG. 6 shows a forest value stack 603 in accordance with an embodiment of the invention. Companies need to evaluate their holdings not just as a static resource, but rather as a dynamic "forest factory" that actively produces value in three streams: traditional wood/pulp products, biomass fuels and carbon-credit trading. Companies need to factor in both the existing traditional value and the potential value that the new value streams will bring, and weigh the two components together. Research suggests that the ability to balance the needs of today and tomorrow (and simultaneously manage across near-term, medium-term, and long-term time horizons) is a fundamental characteristic of high-performance businesses.

Industry experience suggests that these developments mean that companies need to develop a more multifaceted view of forest assets vis-a-vis a traditional forest value stack 601. Consequently, forest value stack 603 includes traditional value component 605, biomass fuel value component 607, and carbon credit value component 609. The traditional forest component 605 is typically less than the traditional value for traditional forest value stack 601; however, the difference is typically exceeded by the gains for the biomass fuel and carbon credits.

By taking this comprehensive view, companies are likely to find that even though the traditionally calculated value of their holdings in mature markets is declining, the new value streams will more than make up for that decline.

Cognizant of these forward-looking and more complete calculations, companies can then create the business case, investment strategies and partnership programs needed to make the best use of their forest assets. If companies decide to retain their holdings, they can ensure that they have the mechanisms in place to extract the full value from the forest factory. Above all, they can avoid losing an important source of value and, ultimately, achieve high performance and greater profitability.

Embodiments of the invention quantify the value of forest factory in relation to the different value components. For example, the value of a forest value may be analyzed in relation to the stumpage land value (corresponding to the lumber and pulp), carbon credit value, and the biomass fuel value. The stumpage land value is based on harvesting timber on a periodic basis. For example, timber is harvested every seven years, in which one seventh of the acreage is cut every year. Embodiments of the invention may determine a value of a forest factory in which timber is harvested on a different period basis. Harvesting periods are typically between seven to twelve years.

The forest factory may include both coniferous trees (softwood, e.g., fir and pin) and deciduous trees (hardwood, e.g., birch and oak). Typically, different parameters for oxygen generation are associated with coniferous forests and with deciduous forest when determining the carbon credit values. CFv designates the carbon credit value per acre, $K_a$ designates a constant value of oxygen generation per 1000 acres of coniferous forest and $K_b$ designates a constant value of oxygen generation per 1000 acres of deciduous forest.) A forest factory may include a mixture of coniferous trees and deciduous trees, where C is the percentage of the forest with coniferous trees and B is the percentage with deciduous trees. According to an embodiment of the invention, one can approximate the value of a forest factory (per acre) with overall percentage of coniferous trees and deciduous trees, using the following relationship:

$$\text{Annual TVFF} = \text{Stumpage Land Price}/7 + \text{CFv} + (K_a * C + K_b * B)/1000 \quad (\text{EQ. 1})$$

In EQ. 1, the harvesting time (crop rotation time period) is seven years, which is typical of a forest factory. Consequently, the stumpage land price is averaged over seven years. However, the embodiment may accommodate a different harvest time. Computer system 100 (as shown in FIG. 2) may be programmed in order to perform the above calculations.

Figure 7:
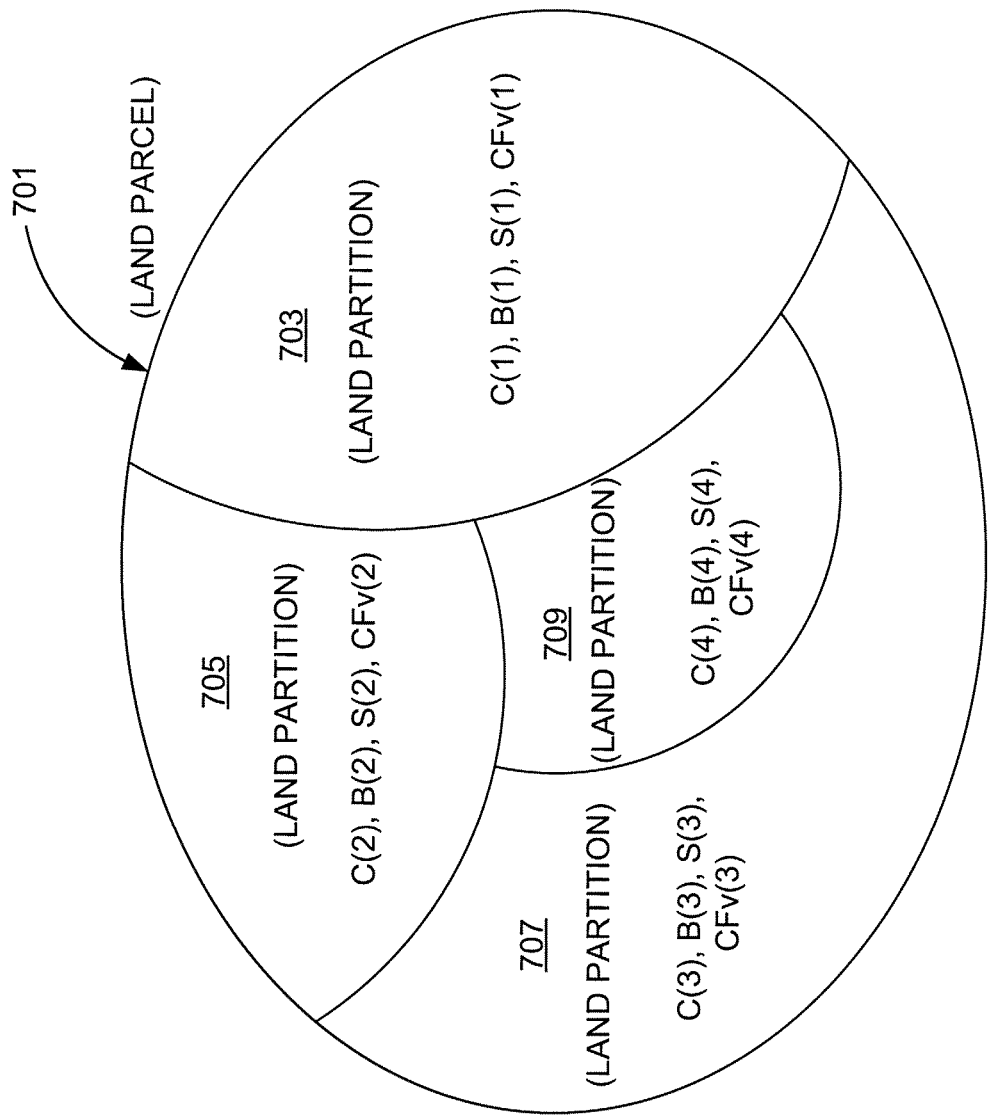
FIG. 7 shows an apparatus that determines an annual total value of a forest factory (TVFF) in accordance with an embodiment of the invention.

FIG. 7 shows a layout of a forest (land parcel 701) that contain land partitions 703-709. Land parcel 701 may have a heterogeneous mixture of trees that correspond to different stumpage land values (S(i), where n equals the number of land partitions of the land parcel and i corresponds to the $i^{th}$ land partition) and carbon credit values (CFv(i)). Each land partition may have a different mix of coniferous trees and with deciduous trees, corresponding to C(i) and B(i), respectively. The following relationship provides an approximate the value of a forest factory (per acre):

$$\text{Annual TVFF} = \text{Stumpage Land Price}/7 + \qquad (EQ.\ 2)$$

$$CFv + \frac{1}{n}\sum_{i=1}^{n}(K_a * C(i) + K_b * B(i))/1000$$

While EQ. 1 and EQ. 2 only analyzes the value of a forest factory with respect to coniferous trees and with deciduous trees, embodiments of the invention may further refine the tree classification based on the tree specie (tree type), e.g., fir or pine rather than coniferous and oak or teak rather than deciduous. For example, the stumpage land value may be refined based on the tree specie.

In order to determine a total land value of the land parcel 701, embodiments of the invention may include a development land value with the forest value (TVFF). The development land value may include the value associated with the intrinsic value of the land (e.g., developing the forest factory into a golf course or condominiums after realizing the TVFF).

Figure 8:
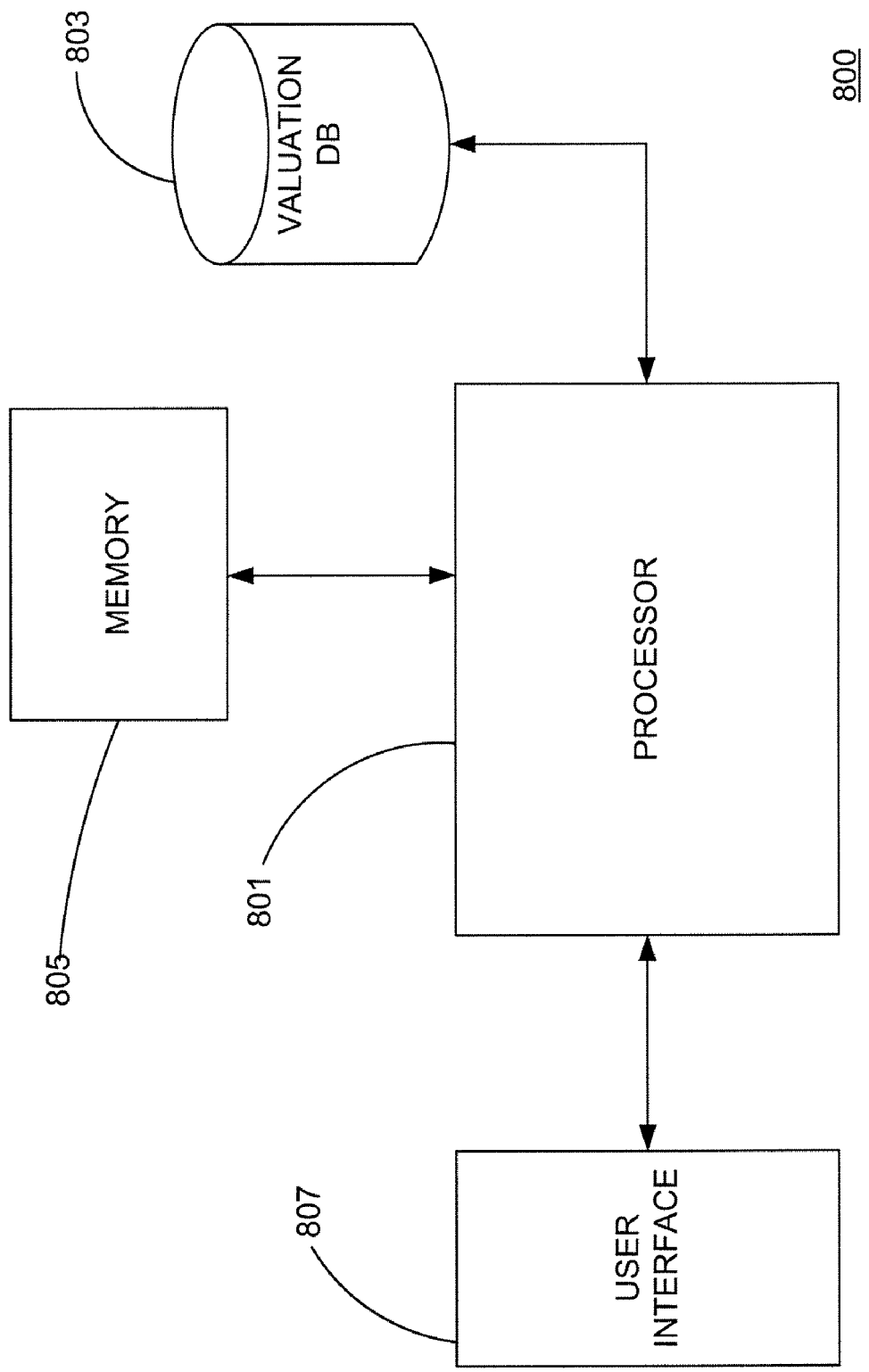
FIG. 8 shows a layout of a land parcel into a plurality of land partitions in accordance with an embodiment of the invention.

FIG. 8 shows apparatus 800 that determines an annual total value of a forest factory (TVFF) in accordance with an embodiment of the invention. Apparatus 800 may be implemented using computer system 100 as previously discussed. Apparatus 800 includes processor 801, valuation database 803, memory 805, and user interface 807. Processor 801 executes computer-executable instructions that are contained in memory 805. For example, computer-executable instructions may be executed to determine the annual TVFF from EQ. 2.

A user may identify the location of a forest factory to apparatus 800 through user interface 807. The forest factory (e.g., land parcel 701) may include a plurality of land partitions (e.g., land partitions 703-709). Processor 801 may access forest parameters (e.g., C(i), B(i), S(i), and CFv(i) for the $i^{th}$ land partition from valuation database 803). Processor 801 consequently determines the value of the forest value and provides the results to the user through user interface 807.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An apparatus that determines a forest value of a land parcel, comprising:
   a memory; and
   a processor that accesses the memory to obtain computer-executable instructions that executes the computer-executable instructions for performing:
   (a) determining a stump land value component of the land parcel;
   (b) determining a biomass fuel value component of the land parcel; and
   (c) determining a carbon credit value component of the land parcel; and
   (d) combining the stump land value component, the biomass fuel value component, and the carbon credit value component to obtain the forest value of the land parcel.

2. The apparatus of claim 1, further comprising:
   a valuation database that contains forest parameters; and
   the processor utilizing the forest parameters to determine the forest value.

3. The apparatus of claim 1, further comprising:
   a user interface to provides a identification of the land parcel; and
   the processor utilizing the identification to determine the forest value.

4. A computer-readable medium having computer-executable instructions to perform:
   (a) determining a stump land value component of the land parcel;
   (b) determining a biomass fuel value component of the land parcel; and
   (c) combining the stump land value component and the biomass fuel value component to obtain a forest value of the land parcel.

5. The computer-readable medium of claim 4 having computer-executable instructions to perform:
   (d) determining a carbon credit value component of the land parcel; and
   (e) adjusting the forest value with the carbon credit value component.

6. The computer-readable medium of claim 4 having computer-executable instructions to perform:
   (d) normalizing the stump land value component by a crop rotation time period.

7. The computer-readable medium of claim 4 having computer-executable instructions to perform:
   (a)(i) determining a corresponding stump land value portion for a corresponding land partition, the land parcel having a plurality of land partitions;
   (a)(ii) determining another stump land value portion for another land partition; and
   (a)(iii) combining the corresponding stump land value portion and the other stump land value portion to obtain the stump land value component.

8. The computer-readable medium of claim 4 having computer-executable instructions to perform:
   (b)(i) determining a corresponding biomass fuel value portion for a corresponding land partition, the land parcel having a plurality of land partitions;
   (b)(ii) determining another biomass fuel value portion for another land partition; and
   (b)(iii) combining the corresponding biomass fuel value portion and the other biomass fuel value portion to obtain the biomass fuel value component.

9. The computer-readable medium of claim 5 having computer-executable instructions to perform:
   (d)(i) determining a corresponding carbon credit value portion for a corresponding land partition, the land parcel having a plurality of land partitions;
   (d)(ii) determining another carbon credit value portion for another land partition; and
   (d)(iii) combining the corresponding carbon credit value portion and the other carbon credit value portion to obtain the carbon credit value component.

* * * * *